Patented Feb. 28, 1933

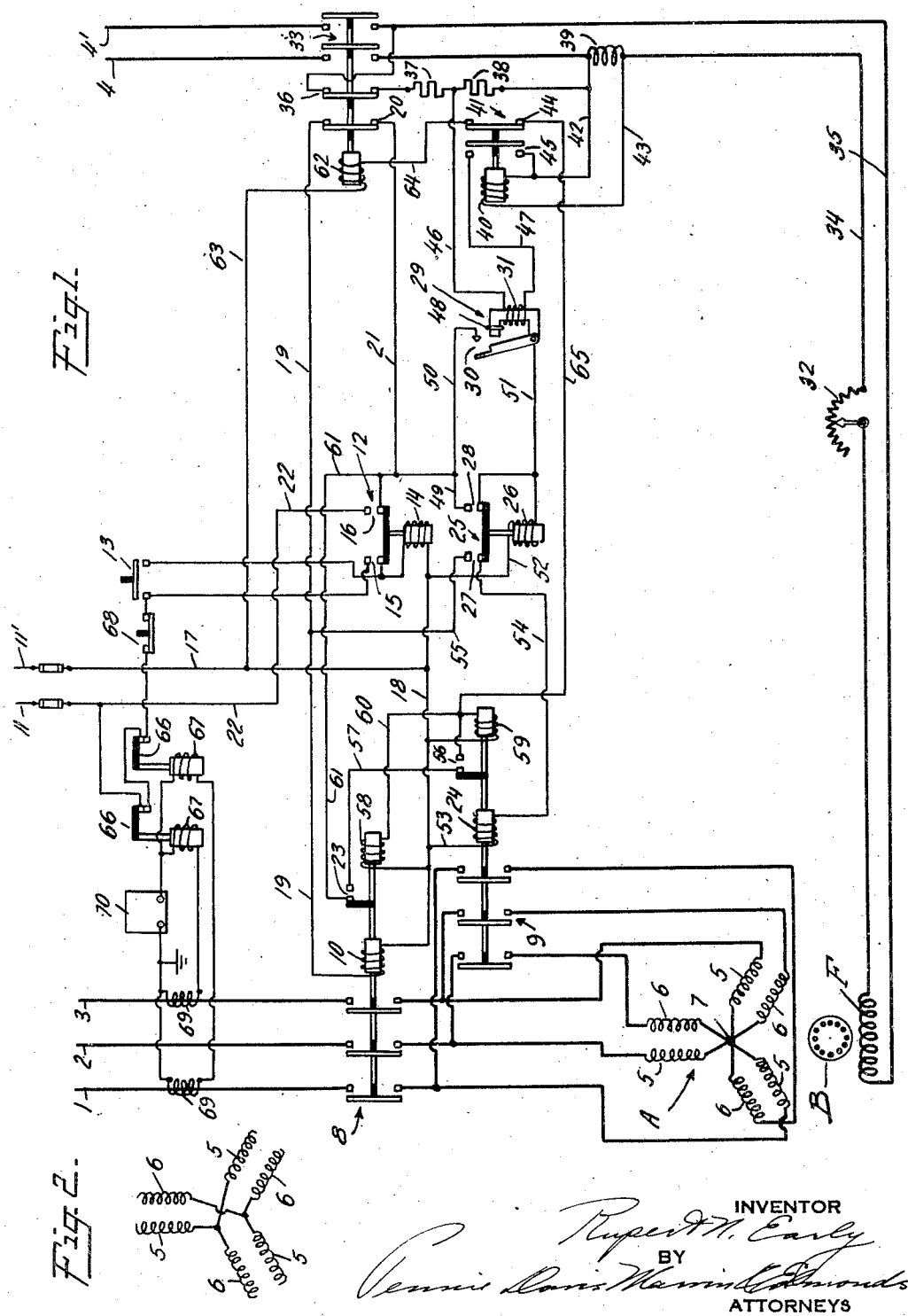

1,899,858

UNITED STATES PATENT OFFICE

RUPERT N. EARLY, OF MINNEAPOLIS, MINNESOTA, ASSIGNOR TO ELECTRIC MACHINERY MANUFACTURING COMPANY, OF MINNEAPOLIS, MINNESOTA

DYNAMO-ELECTRIC MACHINE

Application filed February 24, 1930. Serial No. 430,702.

This invention relates to electric motors and more particularly to improvements in induction motors and synchronous motors and in starting systems for the same. This application is a continuation in part of my co-pending application Serial Number 334,881, filed January 25, 1929.

It is an object of this invention to eliminate the necessity of providing some means external to an electric motor, such as the ordinary autotransformer, resistor or reactor for cutting down the voltage applied to the primary winding during the starting period in accordance with present practice. It is usually desirable and oftentimes essential to provide some means for reducing the voltage applied to the terminals of the motor, at least until the motor has attained a considerable speed, and this for the reason that unless some such means is employed the current taken by the motor is excessive and may cause injury to the motor and an undesirable surge on the line. The apparatus necessary to start a motor by applying reduced voltage and subsequently applying full voltage is necessarily expensive and ordinarily the starting of a motor in this manner involves the interruption of the primary current with the production of an objectionable line surge.

According to my invention I provide a motor having a primary winding of such a nature that the current employed during the initial portion of the starting period may be confined within a portion only of the primary winding although full voltage is applied to the primary. After the motor has attained a speed such that application of full voltage to the entire winding will not produce an undesirable surge on the line the remaining portion of the primary winding is connected to the line to establish normal running conditions. The several motor circuits are connected in parallel during normal operation of the machine and it will be understood that by employing only certain of these circuits during the initial portion of the starting period the primary current is limited to a relatively low value. The impedance of a single winding circuit is greater than that of two such circuits in parallel, hence the reduction in current taken by the motor during the initial portion of the starting period.

My invention contemplates the provision of a motor having a polyphase primary winding, at least one phase of which includes two or more winding sections. During the initial portion of the starting period some but not all of the winding sections are connected to the source of polyphase current. Subsequently, the remaining winding sections are connected across the line so that all winding sections are in parallel relation and the motor is operating under normal running conditions. It will be understood that current is first supplied to a portion of the winding sections and then to all winding sections in parallel relation, thus reducing the value of the current initially supplied to the motor during the starting period.

I may employ winding sections for each phase which are interconnected, or I may employ winding sections for each phase which are not interconnected. For example, I may employ a plurality of star-connected winding sections, one section for each phase, and one or more additional sets of corresponding sections, all sections having their neutral point interconnected. On the other hand I may use a plurality of separate polyphase windings which are not interconnected within the machine. In either case certain of the winding sections are connected to the line to start the motor and after the rotor has attained sufficient speed the remaining winding sections are connected across the line. The several winding sections for each phase may be connected to separate switches, preferably electromagnetically operated, and I may employ automatic or manually operable means, such as a push button, for energizing the circuit of one of the electromagnetic switches to close the same and apply current to certain of the winding sections. I may employ some automatic means for subsequently closing another switch to connect the remaining winding sections across the line. The second switch, or set of contacts, may be controlled by a timing device of any character but I prefer to employ some means responsive to some condition of the motor indicative of the existence of sufficient counter E. M. F. to prevent an excessive flow of current when voltage is applied to all winding sections. For example, I may employ a relay responsive to the electric condition of the primary or secondary winding and preferably the latter. In the event the invention is applied to a synchronous motor the single phase secondary winding may be connected in closed circuit during the starting period and a relay responsive to the induced secondary current may control the connection of the initially inactive sections of the primary winding to the source of alternating current.

I may employ closing coils for closing the switches, or switch contacts connected with the several primary winding sections, and I may employ some means for latching these switches or contacts in closed position, in which event the closing coils may be deenergized and the contacts held in closed position by the latching means. Furthermore I may provide some means, such as an overload relay responsive to an excessive load on the motor for controlling the latching means to disconnect the motor from the line whenever excessive load is placed on the machine. Also where my invention is applied to a synchronous motor I may employ means responsive to the electrical condition of the secondary winding during the starting period for controlling the application of excitation current to the field winding.

The various objects and advantages of my invention will be more apparent upon considering the following detailed description which is to be taken in conjunction with the accompanying drawing illustrating certain embodiments of my invention as applied to a synchronous machine. In the accompanying drawing Fig. 1 is a diagrammatic representation of a synchronous motor and starting system in accordance with my invention;

Fig. 2 is a diagrammatic representation of a form of primary winding somewhat different from that illustrated in Fig. 1.

In Fig. 1, I have illustrated a synchronous motor having a three-phase star-connected primary winding A, a field winding F and a squirrel cage or damper winding B. The leads 1, 2 and 3 represent a source of three-phase alternating current, and a source of direct current is represented by the leads 4 and 4' which may be connected to the field winging F.

Each phase of the primary winding A includes two winding sections 5 and 6, all connected to a common neutral point 7. The winding sections 5 are shown connected to contacts of a switch 8 and the winding sections 6 are connected to the contacts of a switch 9. It will be understood that a single switch structure may be employed instead of the two illustrated at 8 and 9 in which event the winding sections 5 are connected to one set of switch contacts and the winding sections 6 connected to another set of contacts associated with the switch. It will be understood that in the system, as illustrated in Fig. 1, the closing of switch 8 connects the winding sections 5 to the source of alternating current represented by the leads 1, 2 and 3 and that the closing of switch 9 serves to connect the winding sections 6 to this same source. Furthermore it appears that when both switches are closed all winding sections are connected in parallel across the A. C. line.

In starting the motor of Fig. 1 switch 8 is first closed to supply current to the winding sections 5 and after the motor has attained a suitable speed the other switch 9 is closed to connect the winding sections 6 across the line. It will be noted that the winding sections 6 are connected to the line without in any way interrupting the connection of the winding sections 5 to the line. Accordingly, there is no interruption in the flow of current to the primary winding and no surge occurs on the line because of the interruption of current as is the case when a transfer from reduced voltage to full voltage is made in the heretofore practiced manner involving the use of an autotransformer.

I have shown the switch 8 as being operated by a closing coil 10 which may be supplied with current from any suitable control circuit, such as that represented by the leads 11 and 11'. A pilot relay 12 and a starting push button 13 are included in the control circuit and it will be understood that upon closing the push button switch the operating coil 14 of the pilot relay 12 is energized and the contacts 15 and 16 of this relay close. The closing of contacts 15 completes a seal around the push button 13 and the closing of contacts 16 serves to connect the operating coil 10 of the line switch 8 across the supply leads 11 and 11', the circuit being as follows: Lead 11', wire 17, wire 18, closing coil 10, wire 19, switch contacts 20, wire 21, switch contacts 16, wire 22 and lead 11. The closing of switch 8 serves to close auxiliary switch contact 23 associated with this switch.

As explained above, the closing of switch 8 serves to supply current to winding sections 5 and the rotor commences to revolve. After the motor has attained—say 80 per cent of its normal operating speed—(the particular value depending upon operating conditions) the switch 9 may be closed to connect the remaining winding sections 6 across the line.

The closing of switch 9 may be accomplished by means of a closing coil 24 which may be supplied with current from the control circuit represented by the leads 11 and 11'. A control relay 25 may be employed for controlling the energization of the closing coil 24. This relay has an operating coil 26 and contacts 27 and 28. Means are provided for delaying the operation of the control relay and hence the closing of switch 9 until the motor is in proper condition to have its inactive primary winding sections connected across the line. I have represented such a means in the form of a relay 29 having contacts 30 and an operating coil 31 which may be connected in circuit with the secondary winding F on the motor. The winding F is connected to a field rheostat 32 and to a field switch 33 by means of wires 34 and 35. The field switch 33 is open during the starting period and auxiliary contacts 36 associated with the field switch serve to connect the field winding in closed circuit during the starting period through resistance elements 37 and 38. A reactance 39 is also connected in the field circuit and an operating coil 40 of a frequency relay is connected across the reactance 39 by means of wires 42, 43. This frequency relay has normally closed contacts 44 and normally open contacts 45. The operating coil 31 of the relay 29 is connected across the resistance element 38 through contacts 45 of the frequency relay by means of wires 46, 47 and the wire 42.

When voltage is first applied to the motor an induced current of slip frequency is induced in the field circuit and a relatively large portion of this current flows through the coil 40 of the frequency relay 41 due to the fact that this coil is connected across the reactance 39 which is in series with the field winding. The frequency relay immediately operates to open the contacts 44 and close the contacts 45. The closing of contacts 45 inserts relay coil 31 in parallel with resistor 38. This resistor 38 has relatively high resistance and, accordingly, a large part of the induced field current flows through relay coil 31. When the motor speed reaches a value such that it is appropriate to connect the winding sections 6 of the primary winding across the line the frequency of the induced field current has reached such a low value that the relay 29 closes its contacts 30. A damper ring 48 on the core of this relay prevents closing of the contacts 30 until the frequency of the current flowing through the relay coil 31 is reduced to a predetermined value corresponding with a motor speed such that the winding sections 6 may be connected to the line without producing any undesirable line surge.

The operation of relay 29 serves to supply current to the operating coil 26 of the control relay 25, the circuit including the wires 49 and 50, connecting switch contacts 16 of the pilot relay 12 and contacts 30 of the relay 29, and the wires 51 and 52 connecting the control relay coil 26 with the relay 29 and the operating coil 14 of the pilot relay 12. When the control relay operates, its contacts 27 and 28 are closed. The closing of contacts 28 completes a seal around the contacts 30 of the relay 29 and the closing of contacts 27 serves to connect the operating coil 24 of the line switch 29 to the control circuit. The circuit for operating coil 24 is as follows: lead 11', wire 17, wire 18, wire 53, operating coil 24, wire 54, switch contacts 27 of the control relay 25, wire 55, wire 19, auxiliary contacts 20 of the field switch 33, wire 21, contacts 16 of the pilot relay 12, wire 22 and lead 11. It will be noted that energy is supplied to the operating coil of the line switch 9 through the closed contacts 16 of the pilot relay 12, and accordingly, the switch 9 cannot be closed until the pilot relay is energized and current supplied to the operating coil of line switch 8.

The closing of line switch 9 causes auxiliary contacts 56 associated therewith to close and it will be noted that these contacts are connected in series with the auxiliary contacts 23 of the line switch 8 by means of the wire 57. Thus when both auxiliary contacts 23 and 56 are closed, current is supplied to latching coils 58 and 59, the circuit being from control wire 18 through latching coils 58 and 59 and wire 60 to contacts 56, wire 57, contacts 23 and wire 61 to the control circuit wire 49.

When the motor reaches a speed near synchronous speed the coil 40 of the frequency relay 41 becomes deenergized whereupon contacts 44 close and contacts 45 open. The closing of contacts 44 serves to supply current from the control circuit of an operating coil 62 associated with the field switch 33. The circuit for this operating coil 62 is as follows: Lead 11', wire 17, wire 63, closing coil 62, wire 64, switch contacts 44 of the frequency relay 41, wire 65, auxiliary switch contacts 56, wire 57, auxiliary switch contacts 23, wire 61, wire 49, contacts 16 of the pilot relay 12, wire 22 and lead 11.

The closing of the field switch 33 serves to supply excitation to the field winding F from the source of direct currents represented by the leads 4 and 4'. The closing of this field switch also serves to open the auxiliary field contacts 20 and 36. The opening of contacts 36, disconnects the discharge resistance 37 from the field winding F, and the opening of the auxiliary contacts 20 interrupts the flow of current from the control leads 11 and 11' to the closing coils 10 and 24 of the line switches 8 and 9 and it will be understood that thereafter these switches are held in closed position by the latching coils 58 and 59.

As pointed out above the latching coils 58 and 59 are energized through the contacts 16 of the pilot relay 12. The operating coil 14 of this relay derives its current from the control leads through contacts 66 of an overload relay 67 and the contacts of a push button 68. By pressing the button 68 the pilot relay is deenergized and in turn the latching coils 58 and 59 are deenergized to open the line switches 8 and 9. Also the operating coil 62 of the field switch is deenergized and this switch opens to disconnect the field winding from the source of direct current. In like manner the motor is disconnected from the line and from the source of direct current whenever the overload relay 67 operates to open its contacts 66. The overload relay 67 is connected to current transformers 69 in the usual manner and an ammeter 70 may also be connected to the current transformers 69 to indicate the value of the line current.

In Fig. 2 I have illustrated a primary motor winding similar to that shown in Fig. 1 except that the neutral point of winding sections 5 is not connected to the neutral point of winding sections 6. Accordingly, two entirely separate circuits are provided on the primary member. It will be understood that a motor having a primary winding, such as that illustrated in Fig. 2, may be started in exactly the same manner as that described in connection with Fig. 1. The winding sections 5 of the winding of Fig. 2 may be connected to switch contacts and winding sections 6 to separate switch contacts whereby the two sets of winding sections may be independently connected to the line in succession as above described.

The invention, as illustrated in the form illustrated in the accompanying drawing, includes a synchronous motor having two winding sections for each phase of the primary winding, means for independently connecting these winding sections to the line in succession as determined by the operation of a delaying device in the form of a relay responsive to the induced field current and the primary switch contacts which are effectively interlocked to prevent simultaneous closing of all contacts and to insure closing of the contacts in proper sequence. Furthermore the excitation current is automatically supplied to the field winding in accordance with the condition of the field winding.

It is to be understood that my invention is not limited to the specific embodiments illustrated and described but includes such modifications thereof as fall within the scope of the appended claims. For example, while I have illustrated primary windings each phase of which consists of two winding sections it is to be understood that each phase may include more than two winding sections and the expression "comprising two winding sections" employed in the appended claims is intended to define a winding having two or more winding sections per phase.

I claim:

1. The combination of an electric motor having a polyphase primary winding a plurality of phases of which each comprise two winding sections, a source of alternating current, separate switches for connecting the sections of each of said plurality of phases to said source, means for closing said switches, and means for delaying the closing of one of said switches until after the other switch has been closed, whereby current is first supplied to one of said sections and then to both sections in parallel relation.

2. The combination of an electric motor having a polyphase primary winding a plurality of phases of which each comprise two interconnected winding sections, a source of alternating current, separate switches for connecting the sections of each of said plurality of phases to said source, means for closing said switches, and means for delaying the closing of one of said switches until after the other switch has been closed, whereby current is first supplied to one of said sections and then to both sections in parallel relation.

3. The combination of an electric motor having a polyphase primary winding a plurality of phases of which each comprise two winding sections, a source of alternating current, separate switches for connecting the sections of each of said plurality of phases to said source, means for closing one of said switches, electromagnetic means for closing the second switch, means for energizing said electromagnetic means, and means for delaying the closing of said second switch until after the other switch has been closed, whereby current is first supplied to one of said sections and then to both sections in parallel relation.

4. The combination of an electric motor having a polyphase primary winding a plurality of phases of which each comprise two winding sections, a source of alternating current, separate switches for connecting the sections of each of said plurality of phases to said source, means for closing one of said switches, electromagnetic means for closing the second switch, means for energizing said electromagnetic means, and means for delaying the energization of said electromagnetic means until after the first switch has been closed, whereby current is first supplied to one of said sections and then to both sections in parallel relation.

5. The combination of an electric motor having a polyphase primary winding a plurality of phases of which each comprise two winding sections, a source of alternating current, separate switches for connecting the sections of each of said plurality of phases to said source, means for closing one of said switches, electromagnetic means for closing the second switch, means for energizing said electromagnetic means, and electromagnetic means for delaying the energization of said electromagnetic means until after the first switch has been closed, said delaying means being deenergized until said first switch has been closed.

6. The combination of an electric motor having a polyphase primary winding a plurality of phases of which each comprise two winding sections, a source of alternating current, separate switches for connecting the sections of each of said plurality of phases to said source, means for closing one of said switches, electromagnetic means for closing the second switch, means for energizing said electromagnetic means, and electromagnetic means for delaying the closing of said second switch until after the first switch has been closed, said delaying means being responsive to the electrical condition of the motor.

7. The combination of an electric motor having a polyphase primary winding a plurality of phases of which each comprise two winding sections, a source of alternating current, separate switches for connecting the sections of each of said plurality of phases to said source, electromagnetic means for closing said switches, and means for delaying the closing of one of said switches until after the other switch has been closed, said delaying means being responsive to the electrical condition of the motor.

8. The combination of an electric motor having a secondary winding and a polyphase primary winding a plurality of phases of which each comprise two winding sections, a source of alternating current, separate switches for connecting the sections of each of said plurality of phases to said source, manually controllable means for closing one of said switches and means responsive to the electrical condition of one of the motor windings for closing the other switch.

9. The combination of an electric motor having a secondary winding and a polyphase primary winding a plurality of phases of which each comprise two winding sections, a source of alternating current, separate switches for connecting the sections of each of said plurality of phases to said source, manually controllable means for closing one of said switches, and means responsive to the electrical condition of the secondary winding for closing the other switch.

10. The combination of an electric motor having a secondary winding and a polyphase primary winding a plurality of phases of which each comprise two winding sections, a source of alternating current, separate switches for connecting the sections of each of said plurality of phases to said source, closing coils for said switches, manually operable means for energizing one of said closing coils, and means responsive to current in the secondary winding of said motor for energizing the other closing coil.

11. The combination of an electric motor having a secondary winding and a polyphase primary winding at least one phase of which comprises two winding sections, a source of alternating current, separate switches for connecting said sections to said source, closing coils for said switches, manually operable means for energizing one of said closing coils, means responsive to current in the secondary winding of said motor for energizing the other closing coil, means for latching said switches in closed position, and means responsive to current in the secondary winding for deenergizing said closing coils.

12. The combination of an electric motor having a secondary winding and a polyphase primary winding at least one phase of which comprises two winding sections, a source of alternating current, separate switches for connecting said sections to said source, closing coils for said switches, manually operable means for energizing one of said closing coils, means responsive to current in the secondary winding of said motor for energizing the other closing coil, means for latching said switches in closed position, means responsive to current in the secondary winding for deenergizing said closing coils, and means responsive to an overload on the motor for releasing said latching means.

13. The combination of an electric motor having a secondary winding and a polyphase primary winding at least one phase of which comprises two winding sections, a source of alternating current, separate switches for connecting said sections to said source, closing coils for said switches, manually operable means for energizing one of said closing coils, means responsive to current in the secondary winding of said motor for energizing the other closing coil, means for latching said switches in closed position, and means responsive to current in the secondary winding for deenergizing said closing coils and for connecting said secondary winding to a source of direct current.

14. The combination of an electric motor having a polyphase primary winding at least one phase of which comprises two winding sections, a source of alternating current, separate sets of switch contacts for connecting the sections of each of said plurality of phases to said source, means for closing said contacts, and means for delaying the closing of one set of said contacts until after the other set has been closed, whereby current is first supplied to one of said sections and then to both sections in parallel relation.

15. The combination of an electric motor having a secondary winding carrying an induced current during the starting period and a polyphase primary winding a plurality of phases of which each comprise two winding sections, a source of alternating current, separate switches for connecting the sections of each of said plurality of phases to said source, means for closing said switches, and means for delaying the closing of one of said switches until after the other switch has been closed, whereby current is first supplied to one of said sections and then to both sections in parallel relation.

16. The combination of a synchronous motor having a single phase field winding, a damper winding and a polyphase primary winding, a plurality of phases of which each comprise two winding sections, means for connecting said field winding in closed circuit during the starting period, a source of alternating current, separate switches for connecting the sections of each of said plurality of phases to said source, means for closing said switches, means for delaying the closing of one of said switches until after the other switch has been closed, whereby current is first supplied to one of said sections and then to both sections in parallel relation, a source of excitation current and means for connecting said source of excitation current to said field winding when the motor has nearly reached synchronous speed.

17. The combination of a synchronous motor having a single phase field winding, a polyphase primary winding, a plurality of phases of which each comprise two winding sections, means for connecting said field winding in closed circuit during the starting period, a source of alternating current, separate switches for connecting the sections of each of said plurality of phases to said source, means for closing said switches, means for delaying the closing of one of said switches until after the other switch has been closed, whereby current is first supplied to one of said sections and then to both sections in parallel relation, a source of excitation current and means for connecting said source of excitation current to said field winding when the motor has nearly reached synchronous speed.

18. The combination of a synchronous motor having a single phase field winding, a polyphase primary winding at least one phase of which comprises two winding sections, means for connecting said field winding in closed circuit during the starting period, a source of alternating current, separate switch contacts for connecting said primary connections to said source, means for closing said switch contacts in sequence, a source of direct current, and means responsive to current induced in said field winding for interrupting the closed circuit connection of said field winding and for connecting said field winding to said source of direct current.

19. The combination of a synchronous motor having a single phase field winding, a polyphase primary winding at least one phase of which comprises two winding sections, a source of alternating current, separate switch contacts for connecting said sections to said source, electromagnetic means for closing said sets of contacts in sequence, a source of direct current, a field switch, an auxiliary switch associated with said field switch for connecting the field winding in closed circuit during starting period, means responsive to current induced in said field winding for operating said field switch and said auxiliary switch to interrupt the closed circuit connection of the field winding and connect the field winding to said source of direct current, and means for preventing the operation of said field switch until all of said switch contacts have been closed.

20. In combination, a supply circuit, a squirrel-cage polyphase motor having a plurality of electrically independent similar phase circuits on its stator, a predetermined number of said circuits being connected in star and the remaining circuits being arranged for connection in open circuit star and in parallel relation with said other circuits, a switch for connecting said predetermined circuits to said supply circuit while the remaining circuits are in open circuit star, and means operative in accordance with a predetermined sub-synchronous speed of said squirrel cage for closing the open circuit in said remaining circuits.

21. In combination, an alternating current supply circuit, a direct current source of supply, a polyphase synchronous motor having a primary member provided with a plurality of electrically independent similar phase circuits and a secondary member including a squirrel-cage winding and a direct current exciting winding, a switch for connecting one of said primary circuits to said supply circuit while another of said primary circuits is idle, and switching means operative in accordance with the speed of said secondary member for connecting said other circuit in parallel relation with said one circuit and for connecting said exciting winding to said direct current source.

22. In combination, an alternating current supply circuit, a direct current source of supply, a polyphase synchronous motor having a primary member provided with a plurality of electrically independent similar phase circuits and a secondary member including a squirrel-cage winding and a direct current exciting winding, a predetermined number of said primary circuits being connected in star and the remaining primary circuits being arranged in open circuit star and for connection with said other stator circuits, a switch for connecting said predetermined primary circuits to said supply circuit while the remaining primary circuits are idle, and switching means operative in accordance with the speed of said secondary member for closing the open circuit in said remaining primary circuits and for connecting said exciting winding to said direct current source.

23. In combination, a supply circuit, a squirrel-cage polyphase motor having a primary member provided with a plurality of electrically independent circuits in each of its stator phases and a secondary member, a predetermined number of said stator circuits being connected in star and the other stator circuits having one set of terminals connected to terminals of said predetermined stator circuits and arranged for connection in star with neutral end connections in open circuit, switching means for connecting said predetermined stator circuits to be energized from said supply circuit, and switching means operative in accordance with a predetermined speed of said secondary member for connecting all of said stator circuits in parallel relation in a plurality of independent neutral star-connected groups.

24. The combination of a synchronous motor having a single phase field winding, a polyphase primary winding, a plurality of phases of which each comprise two winding sections, a source of alternating current, separate switches for connecting the sections of each of said plurality of phases to said source, means for closing said switches, means for delaying the closing of one of said switches until after the other switch has been closed, whereby current is first supplied to one of said sections and then to both sections in parallel relation, a source of excitation current and means for connecting said source of excitation current to said field winding when the motor has nearly reached synchronous speed.

25. In combination, a supply circuit, a squirrel-cage polyphase motor having a primary member provided with a plurality of electrically independent circuit in each of its stator phases and a secondary member, a predetermined number of said stator circuits being connected in star and the other stator circuits connected in open circuit star, switching means for connecting said predetermined stator circuits to be energized from said supply circuit, and switching means operative in accordance with a predetermined speed of said secondary member for connecting all of said stator circuits in parallel relation in a plurality of independent neutral star-connected groups.

In testimony whereof I affix my signature.

RUPERT N. EARLY.

CERTIFICATE OF CORRECTION.

Patent No. 1,899,858.  February 28, 1933.

RUPERT N. EARLY.

It is hereby certified that error appears in the printed specification of the above numbered patent requiring correction as follows: Page 2, line 56, for "winging" read "winding"; page 5, lines 107 and 108, claim 14, strike out the words "at least one phase of which comprises" and insert instead "a plurality of phases of which each comprise"; page 7, line 5, claim 23, for "cuts" read "cuits", and line 37, claim 25, for "circuit" read "circuits"; and that the said Letters Patent should be read with these corrections therein that the same may conform to the record of the case in the Patent Office.

Signed and sealed this 11th day of April, A. D. 1933.

M. J. Moore.
Acting Commissioner of Patents.

(Seal)